US011303698B1

(12) United States Patent
Keren et al.

(10) Patent No.: US 11,303,698 B1
(45) Date of Patent: Apr. 12, 2022

(54) MANAGING CASE SENSITIVITY IN A MULTI FILE PROTOCOL ENVIRONMENT

(71) Applicant: Vast Data Ltd., Tel Aviv (IL)

(72) Inventors: Guy Keren, Tel Aviv (IL); Hadar Hen-Zion, Tel Aviv (IL); Ori Mamluk, Tel Aviv (IL); Oded Sonin, Tel Aviv (IL); Avi Goren, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 0 days.

(21) Appl. No.: 17/207,720

(22) Filed: Mar. 21, 2021

Related U.S. Application Data

(63) Continuation-in-part of application No. 17/011,380, filed on Sep. 3, 2020.

(51) Int. Cl.
| | |
|---|---|
| *H04L 29/08* | (2006.01) |
| *H04L 29/06* | (2006.01) |
| *H04L 67/06* | (2022.01) |
| *H04L 67/01* | (2022.01) |
| *H04L 67/568* | (2022.01) |
| *H04L 67/561* | (2022.01) |
| *H04L 67/1097* | (2022.01) |

(52) U.S. Cl.
CPC .......... *H04L 67/06* (2013.01); *H04L 67/1097* (2013.01); *H04L 67/2804* (2013.01); *H04L 67/2842* (2013.01); *H04L 67/42* (2013.01)

(58) Field of Classification Search
CPC ...... H04L 67/06; H04L 67/10–67/1097; H04L 67/28–67/2847; H04L 67/42
See application file for complete search history.

(56) References Cited

U.S. PATENT DOCUMENTS

| | | | |
|---|---|---|---|
| 2013/0254272 A1* | 9/2013 | George | H04L 67/2842 709/203 |
| 2015/0227535 A1* | 8/2015 | Avati | G06F 16/137 707/741 |
| 2019/0026301 A1* | 1/2019 | Wang | G06F 16/152 |

OTHER PUBLICATIONS

Hitachi, Configuring the CIFS Protocol, May 24, 2019, pp. 1-5 (Year: 2019).*

* cited by examiner

*Primary Examiner* — Clayton R Williams
(74) *Attorney, Agent, or Firm* — Reches Patents

(57) ABSTRACT

A method for preventing file system case related errors, the method may include receiving, by a storage system, an indication that a case insensitive file system client intends to cache a first file of a file system; searching for match between (a) at least a part of a case-insensitive version of a case-sensitive pathname of the first file, and (b) at least a part of a case-insensitive version of a case-sensitive pathname of a second file that belongs to the file system and differs from the first file; and preventing a caching of the first file by the case insensitive file system client.

20 Claims, 6 Drawing Sheets

MANAGING CASE SENSITIVITY IN A MULTI FILE PROTOCOL ENVIRONMENT

CROSS REFERENCE

This application is a continuation in part of U.S. patent application Ser. No. 17/011,380 filing date 3 Sep. 2020 which is incorporated herein by reference.

TECHNICAL FIELD

The present disclosure generally relates to the field of data storage, and more particularly to managing case sensitive file protocols and case insensitive file protocols.

BACKGROUND

A storage system may include multiple compute nodes and multiple storage nodes. Non-limiting examples of compute nodes and storage nodes are illustrated in US patent application 2019/0141128 which is incorporated herein by reference.

A storage system may be required to support different filesystem protocols.

Filesystem protocols may support case sensitivity for file and directory names or may handle names as case insensitive. With regard to NAS (Network Attached Storage) protocols—a Network File System (NFS) manages clients' file and directory names as case sensitive, while a Server Message Block (SMB) (SMB is a protocol mostly used when running Microsoft Windows) handles names as case-insensitive.

When using a protocol that supports case sensitivity, two files (or directories) may be created in the same directory with the same name but with different letter case. When using SMB, creating two files with the same name and different letter case is not allowed. However, SMB is a case preserving (or case aware) protocol, meaning that it will forward a client request with the original letter case that was requested. On the other hand—the SMB makes determinations relating to files (for example—when determining to which file to access) in a case insensitive manner.

When implementing a multiprotocol file server, conflicts may arise when files are created by a NFS client and later being accessed by a SMB client.

Various client-side file systems allows caching file handles and files' data. When a filesystem is shared among multiple clients, before caching accessed files, there is a need to ensure that the client is the only client that is currently accessing the file. Ensuring exclusive access to a file requires techniques known as locking and leasing.

SMB employs "oplocks" (opportunistic locks) or "lease oplocks", as part of the file open request, to enable an SMB client in a multi-client file-sharing environment to perform client-side caching of accessed files. This improves performance by reducing network traffic.

There is a need to avoid file name conflicts in a client cache enabling environment when accessing a multiprotocol server.

SUMMARY

There may be provide a storage system, a method and a non-transitory computer readable medium for hierarchical workload allocation in a storage system.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
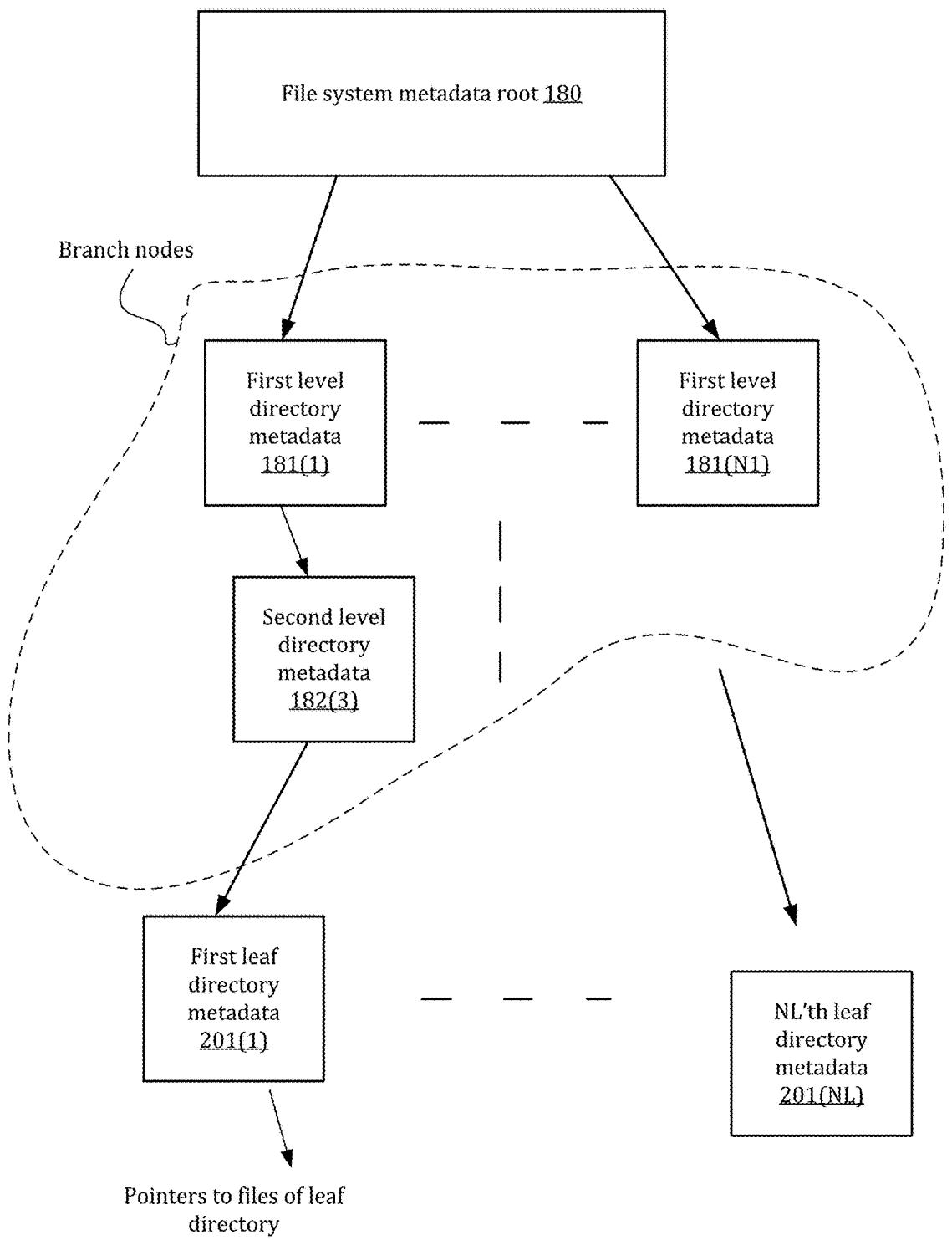
FIG. 1 illustrates an example of file system metadata.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a compute core. The compute core can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

There may be provided a storage system, a method and a non-transitory computer readable medium for detecting a case where a case insensitive file system client (a client using a case-insensitive file protocol (e.g., SMB)) may open two files with the same name and different letter case, and prevent the caching of any of the two files by the client computer, when the client initially accesses (e.g., request to open) the first of the two files.

The storage system provides the server side of a multi-protocol filesystem, where the multiprotocol filesystem can be accessed by both case-sensitive file protocols and case-insensitive file protocols.

Suppose two files were created by a NFS client with the same name but different letter case, e.g., File1 and file1. After the files were created using the NFS protocol, a SMB client is accessing one of the files (e.g., "File1") that is in turn being cached by the SMB in the client computer.

Subsequently, the SMB client requests to access the second file with the same name and different case (e.g., "file1")—the SMB at the client side will block the forwarding of the request towards the storage system, since it assumes that the file is already cached, and may cause the client to work on the wrong file.

This scenario may be referred to as a case related problem.

A case related problem may also occur when accessing files in different directories (directories being are a part of a file name) having the same directory name but with different letter case.

For example, the client opens a file name "/dir1/a.txt", and both the file and the directory handles are cached. Then—the client tries to access a file under a similar directory, e.g., "/DIR1/b.txt", the operating system may use the wrong directory handle, i.e., the handle of "dir1", from its cache, and may try to access the second file in a wrong directory.

According to embodiments of the present disclosure, when the storage system that handles a multi file-protocol environment receives a request to perform an initial access to a file, from a client that utilizes a case insensitivity file protocol (e.g., SMB), a check will be performed to determine whether another file with the same name (but different case) exists—i.e., whether a case related problem may potentially occur. The initial access may refer to a file-open command, or any command that initiates one or more operations on the file, and that may trigger caching of the file.

The check may be performed on any portion within the requested file pathname. The portion within the file pathname refers to any directory within the file-pathname. For example, if the open command indicates a file named "dir1/a.txt", then both the directory "dir1" and the file "a.txt" may be checked for existence of another directory and/or file sharing the same name and different letter case. It may be sufficient to determine that at least one of the portions in the pathname has a conflicting name.

If a conflicting name is determined, then—when receiving from the client a command that implies an intention to cache the file—the request is denied. The request may be denied if it is determined that one of the portions within the path or the filename itself, has a name that conflicts with another name in the same hierarchy.

The command that implies an intention to cache the file may include a request to acquire an exclusive access to the file or directory, e.g., a lock, a lease, or specifically in SMB—an oplock or lease oplock, which is a parameter within the file open request.

In the case of denying the request that implies an intention to cache (e.g., a request to acquire an exclusive access), the client continues to access the file as usual, but with no caching. Therefore, when the client will try to access the second file with the same name, the client filesystem will not assume any cached data, but rather forward the request to the storage system, with the exact name of the second file.

Examples of determining whether more than one file exists with the same name and different case are listed below.

The filename indicated in the open request received from a client (herein "case sensitive name" or "original filename") is translated into a case insensitive filename. The case insensitive filename is composed of a pre-determined letter case, for example: all upper case or all lowercase letters.

The case insensitive filename is looked up in a name data structure that describes the names within the specific directory. The name data structure allows case-insensitive searches of files and directory name.

In order to allow case-insensitive searches of names, when a new file (or directory) is created, both the original name of the file and a case-insensitive version of the file name are catalogued in the name data structure (also referred to as file system metadata or directory metadata). The name data structure is sorted in an alpha numeric order, so in case where more than one file exist with the same name, all instances of the case-insensitive version of the file name can be found within a close locality in the data structure.

Figure 2:
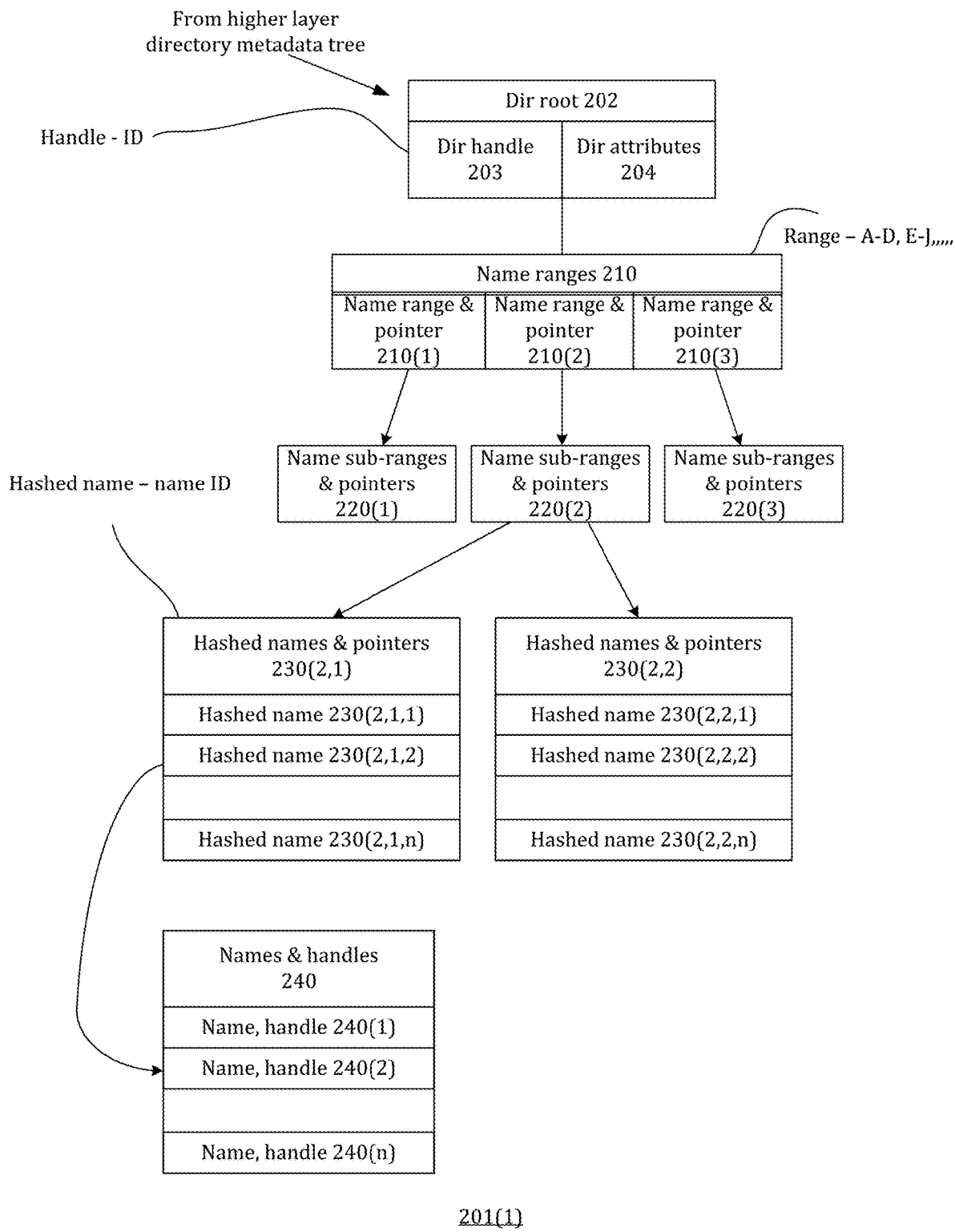
FIG. 2 illustrates an example of a method.

An example of a file system metadata are shown in FIGS. 1 and 2. FIG. 1 illustrates a tree like file system metadata 200 while FIG. 2 illustrates directory metadata 201(1).

In the directory metadata 201(1) there are multiple levels. The root level, directory root 202, includes directory characteristics, such as a directory handle 203 that identifies the directory and various attributes 204.

The root level is associated with a catalog of name ranges 210, where each entry, e.g., name range & pointer 210(1)-210(3), includes the alphanumeric range that is pointed by the entry, and a pointer to a lower level in the tree. The name ranges are split and may span over one or multiple intermediate levels of the tree (depending on the number of files in the directory), such as the level name-sub-ranges 220, that may include pointer for each sub-range, either to another layer of sub-ranges, or to a hashed names level 230.

FIG. 2 illustrates the tree node name-sub-ranges 220(2), as pointing to two blocks of hashed names and pointers 230(2,1) and 230(2,2), each of the blocks 230 is associated with a different sub-range of names.

The hashed names are used to facilitate name comparison and to save storage space, since the layers above the lowest layer may be stored in a non-volatile memory (NVRAM), while the lowest layer may be stored in disks, such as SSDs.

Each entry in the hashed names level further points to a name block that may be stored in the SSD, such as names and handles block 240. Block 240 includes the full filenames and the file handles.

When a new file is created, two entries are created in the hashed names 230 level. One entry includes the original filename, and the other includes a case-insensitive version of the filename.

Both entries are associated with the same file handle, and therefore both entries will point to the same name block. Entries that include case-insensitive filenames are marked with a special mark indicating that these entries do not belong to real files and should be ignored upon certain operations, such as a "directory read".

If two files are associated with the same case-insensitive name, then there will be two entries in the hashed names level, each includes the same hash that corresponds to the same case-insensitive version of the filename, but with different pointers to entries in the name level 240, where each entry in the name level 240 includes a different filename and different handle.

Checking whether a conflict filename exists includes looking up the tree using the case-insensitive filename. When reaching the hashed name block that is pointed by the upper level (name sub-range) as including one or more entries of the case-insensitive filename, the block is scanned, looking for existence of more than one entry associated with the same case-insensitive filename (or with the hash of that name), that corresponds to the searched case-insensitive filename (or its hash).

Figure 3A:
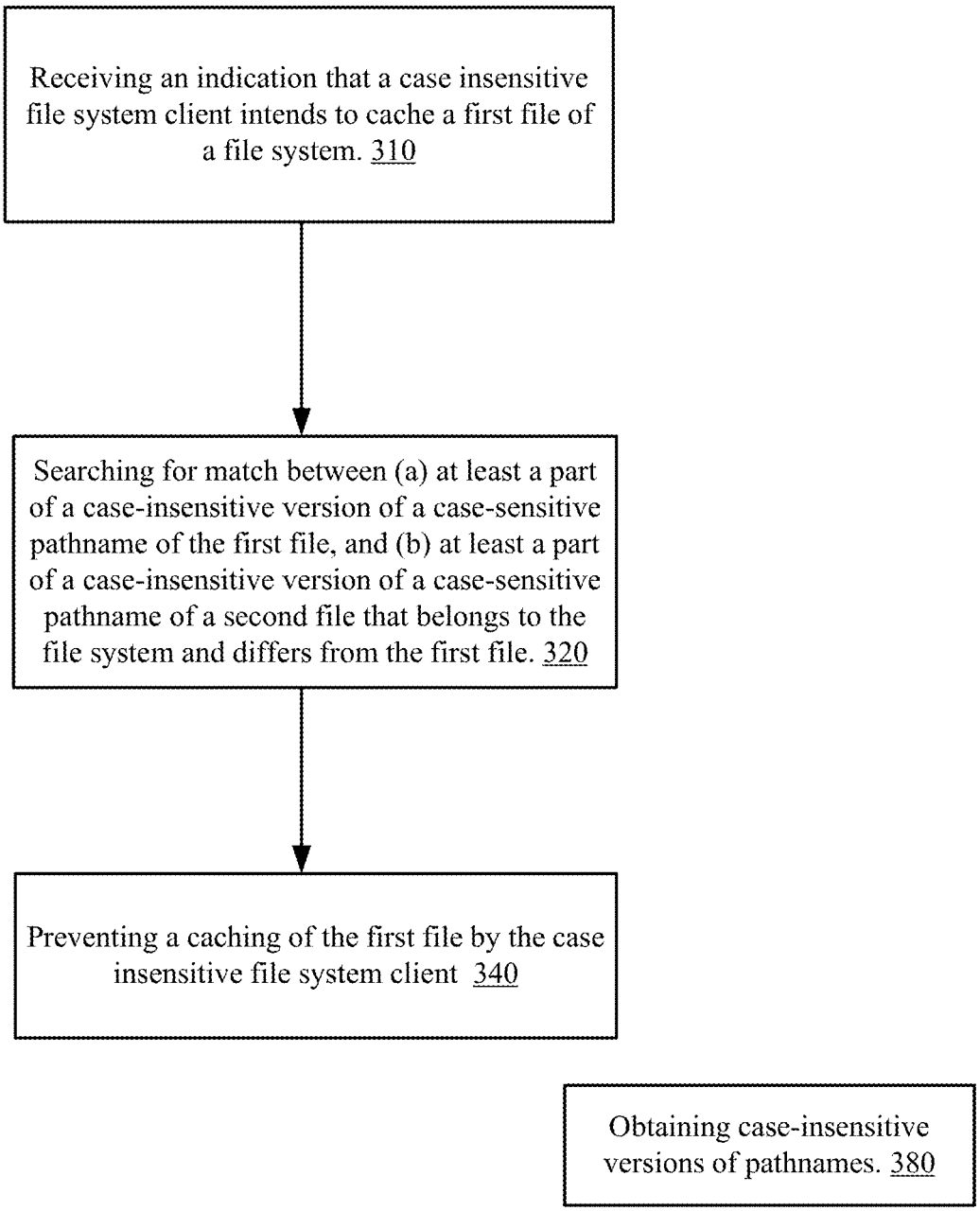
FIG. 3A illustrates an example of a method.

FIG. 3A illustrates a method 300 for preventing case related problems. The steps of method 300 may be executed by a filesystem server that is implemented by a storage system that is coupled to case insensitive file system clients and case sensitive file system clients.

Method 300 starts by step 310 of receiving an indication that a case insensitive file system client intends to cache a first file of a file system.

The indication may be a hint, an explicit request to cache the first file, a request to gain exclusive access to the first file, a command for accessing or opening the first file that includes a request to gain exclusive access to the first file, and the like.

The first file may be accessed using a first file pathname. The first file pathname may include multiple parts—such as one or more directories of different levels in which the first file is stored, and a file name of the first file.

The first file may be created by a case sensitive file system client.

Step 310 may be followed by evaluating whether a case related problem may exist if the first file is cached—and if so—preventing the caching of the first file.

Step 310 may be followed by step 320 of searching for match between (a) at least a part of a case-insensitive version of a case-sensitive pathname of the first file, and (b) at least a part of a case-insensitive version of a case-sensitive pathname of a second file that belongs to the file system and differs from the first file. The case-sensitive pathname of the first file may be associated with the indication that the case insensitive file system client intends to cache the first file, for example, the case-sensitive pathname of the first file may be indicated by a command (e.g., "open") received from the client, wherein the command includes the indication that a case insensitive file system client intends to cache the first file of a file system.

The case-insensitive versions of the pathnames may be of a predefined format (for example only small caps, only large caps or any predefined combination of small caps and large caps). A case-insensitive version of a pathname may be generated when a new path is added to a file system.

When there is a match—step 320 may be followed by step 340 of preventing a caching of the first file by the case insensitive file system client. The preventing of the caching may include rejecting the request to gain an exclusive access to the first file.

Else—the case insensitive file system client may be allowed to cache the first file.

Method 300 may also include step 380 obtaining case-insensitive versions of pathnames. This may include receiving or generating a case-insensitive of a case sensitive pathname of a file whenever a new file is added to the file system, whenever the name of the file changes, and the like.

Figure 3B:
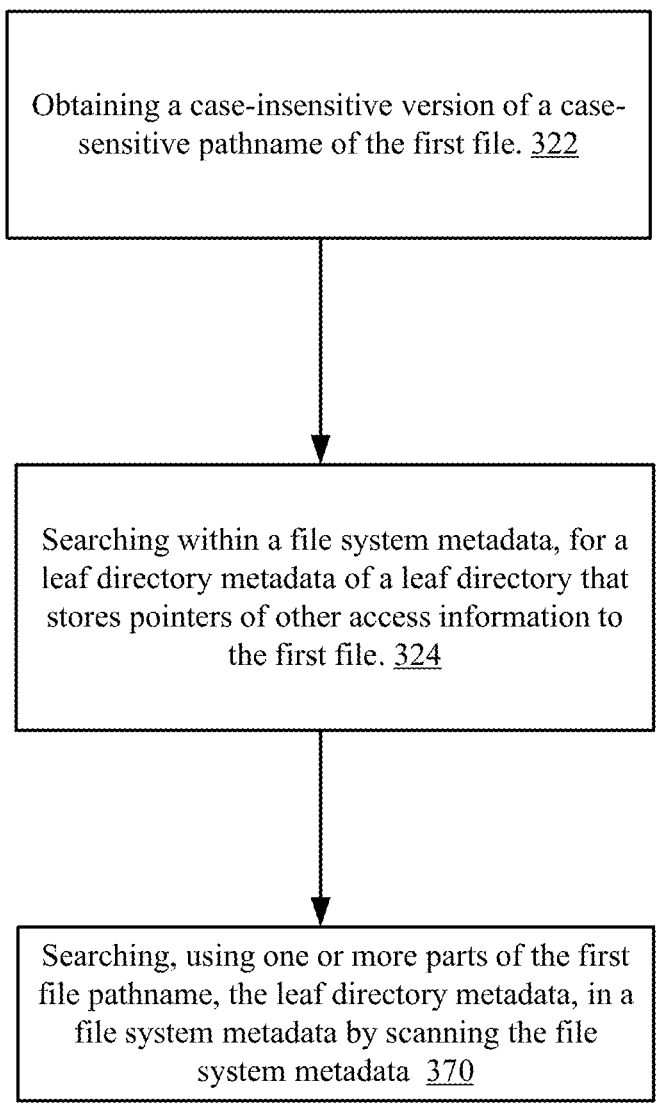
FIG. 3B illustrates an example of a step of the method of FIG. 3A.

FIG. 3B illustrates an example of step 320.

Step 320 may start by step 322 of obtaining a case-insensitive version of a case-sensitive pathname of the first file.

Step 322 may be followed by step 324 of searching within a file system metadata, for a leaf directory metadata of a leaf directory that stores pointers of other access information to the first file. The leaf directory is the directory that hosts the first file.

Step 324 may include step 326 of searching, using one or more parts of the first file pathname, the leaf directory metadata, in a file system metadata (for example file system metadata 200) by scanning the file system metadata.

For simplicity of explanation it is assumed that the case-sensitive pathname of the first file is Alex1/Bob3/Lillian1/F1. Alex1 being the case sensitive name of a first level directory represented by first level directory metadata 181(1) of FIG. 1. Bob3 being the case sensitive name of a second level directory represented by second level directory metadata 182(3). Lillian1 being the case sensitive name of a leaf directory represented by leaf directory metadata 201(1). The file name of the first file is F1.

For simplicity of explanation it is assumed that the predefined format of a case
insensitive version of a case sensitive path name includes only small caps. Thus—the case-insensitive version of the case sensitive pathname of the first file will be alex1/bob3/lillian1/f1.

This case-insensitive version of the case sensitive pathname of the first file includes four parts—alex1, Bob3, lillian1 and f1.

The first file will be found when traversing the file system metadata by starting from the file system metadata root 180, passing through first level directory metadata 181(1), second level directory metadata 182(3), and first leaf directory metadata 201(1).

Starting in the file system metadata root 180—if the file system does include two first level directories that have a case-insensitive directory name of alex1—the search should determine which first level directory having a case-independent name of alex1—is Alex1—in order to process and find the first file. The same is applied to each other layer directory.

The names of the directories and files may be hashed—and thus each comparison (of search phase) may include searching for the same hashed names—and when the same hash names are found—searching for a match in the names associated with the hashed names.

Referring to FIG. 2—one or more entries of hashed names and pointers may store the hash value (referred to as HV(f1)) of the case-insensitive version of "f1" (the hashed value is tagged as being a case-insensitive version).

If there is at least one other hash value that equals HV(f1)—then the non-hashed case-insensitive versions of the file names should be compared to each other—and a match is found—the caching should be prevented.

For example—if Alex1/Bob3/Lillian1 also include another file whose case-insensitive name is f1—then caching of the first file will be prevented.

Referring to the first file having file pathname Alex1/Bob3/Lillian1/F1, step 320 may include:

a. Searching in a root directory of a file system for a first level directory metadata that corresponds to the name Alex1. This may include performing a search (initial search) in a domain of hashed values obtained by applying a hash function on names of case-insensitive versions of first level directory names. If there is only one hash value that equals HV(alex1) then the method may continue by reaching first level directory metadata 181(1). If there are more than one hash values—searching (additional search) in a non-hashed domain of names of case-insensitive versions of first level directory names.

b. The first level directory metadata 181(1) is searched in a similar manner—but for finding the correct second level directory metadata 182(3)).

c. The second level directory metadata 182(3) is searched in a similar manner—but for finding the correct leaf directory metadata 201(1).

d. The leaf directory metadata 201(1) is searched in a similar manner—but for finding the first file.

Any reference to a search after a file should be applied mutatis mutandis to searching after a handle of a file and/or to searching for a directory. For example—the storage system may receive an indication that a case insensitive file system client intends to cache a handle of first file of a file system, and may determine whether to prevent the caching.

Figure 4A:
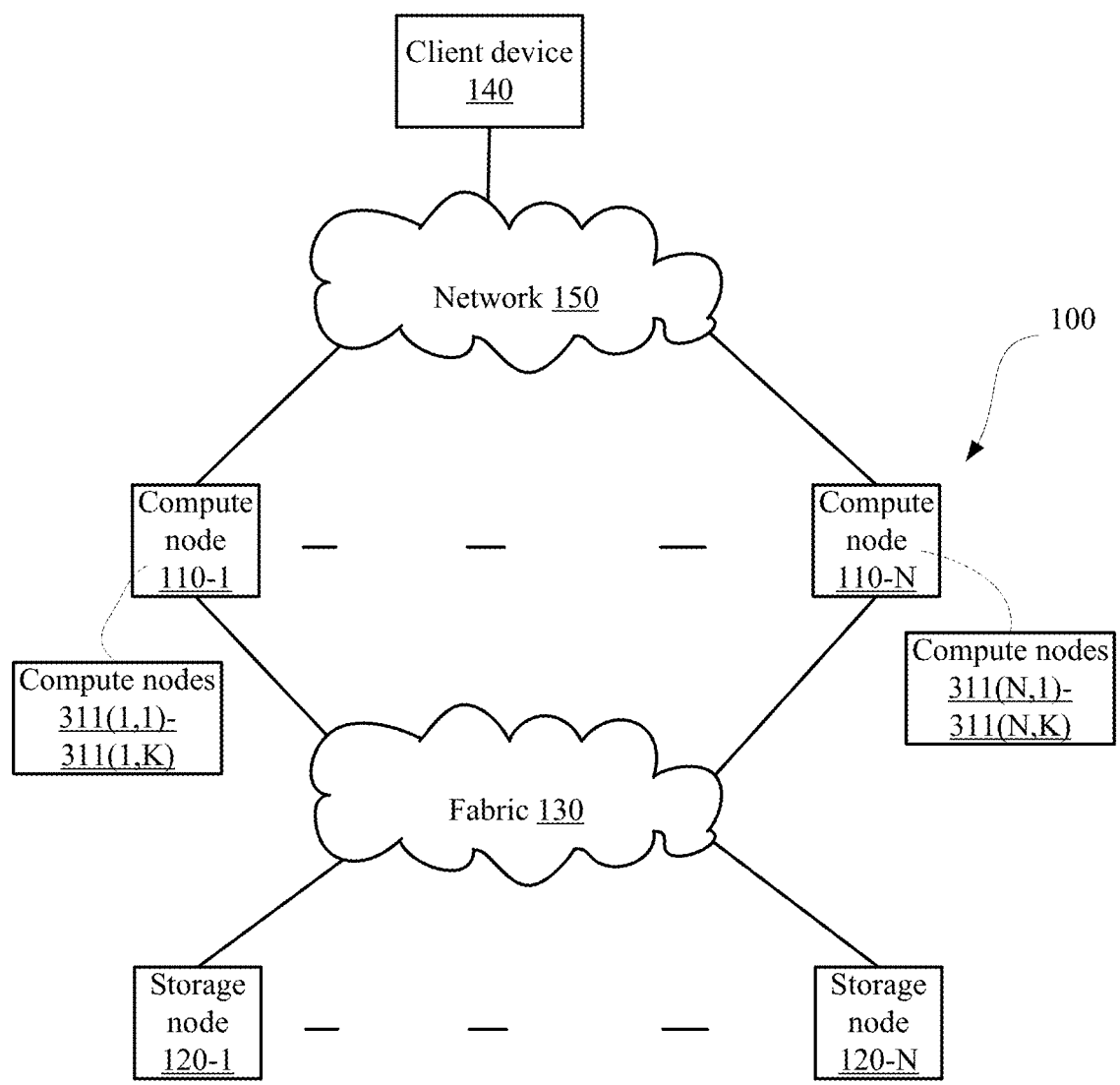
FIG. 4A is an example of a storage system.

FIG. 4A shows an example diagram of a storage system 100 according to the disclosed embodiments.

The storage system 100 includes a number of N compute nodes 110-1 through 110-N (hereinafter referred to individually as a compute node 110 and collectively as compute nodes 110, merely for simplicity purposes, N is an integer equal to or greater than 1). The compute nodes include (or may execute) multiple compute cores each—see for example compute nodes 311(1,1)-311(1,K) and compute nodes 311(N,1)-311(N,K).

The storage system 100 also includes a number of M storage nodes storage node 120-1 through 120-M (hereinafter referred to individually as a storage node 120 and collectively as storage nodes 120, merely for simplicity purposes, M is an integer equal to or greater than 1). The computer nodes 110 and the storage nodes 120 are connected through a communication fabric 130. M may equal N or may differ from N.

In an embodiment, a compute node 110 may be realized as a physical machine or a virtual machine. A physical machine may include a computer, a sever, and the like. A virtual machine may include any virtualized computing instance (executed over a computing hardware), such as a virtual machine, a software container, and the like.

It should be noted that in both configurations (physical or virtual), the compute node 110 does not require any dedicated hardware. An example arrangement of a compute node 110 is provided in FIG. 4D.

A compute node 110 is configured to perform tasks related to the management of the storage nodes 120. In an embodiment, each compute node 110 interfaces with multiple clients, such as a client device 140, which may be a case insensitive file system client or a case sensitive file system client, via a network 150. To this end, a compute node 110 is configured to receive requests (e.g., read or write requests) and promptly serve these requests in a persistent manner. The network 150 may be, but is not limited to, the Internet, the world-wide-web (WWW), a local area network (LAN), a wide area network (WAN), and the like.

In an embodiment, a compute node 110 is configured to interface with different protocols implemented by the client devices or applications (e.g., TCP/IP, HTTP, FTP, etc.), as well as file protocols (e.g., SMB, NFS) and to manage the read and write operations to the storage nodes 120. The compute node 110 is further configured to translate the protocol commands into a unified structure (or language). Then, each compute node 110 is also configured to logically address and map all elements stored in the storage nodes 120.

Further, each compute node 110 may maintain the logical operations of elements and the relationships between the elements (for example, directory trees) and an element attribute (e.g., metadata) via state stored on the storage nodes 120. An element may include a file, a directory, an object, and the like. The mapping and addressing of the elements allow the compute node 110 to maintain the exact physical locations of the elements in the storage nodes 120.

In an embodiment, to efficiently read and write data to the storage nodes 120 from the physical layer, each compute node 110 performs a number of processes including data reduction, data resiliency, and Flash memory management actions (e.g., defrag, wear leveling, and so on).

It should be noted that each compute node 110 may operate in the same manner as all other compute nodes 110. In a case of a failure, any compute node 110 can replace the failed node. Further, each compute node may control and manage one or mode storage nodes 120 regardless of the specific architecture of the storage nodes 120. Therefore, there is no coupling between specific compute nodes 110 and specific storage nodes 120. As such, compute nodes can be added to the system 100 without increasing the number of storage nodes (or their capacity), and vice versa, storage nodes can be added without increasing the number of compute nodes 110.

Storage system 100 and particularly compute nodes 110 implement a multi file protocol environment for supporting the server side of both case insensitive file system and case sensitive file system.

The storage nodes 120 provide the storage and state in the system 100. To this end, each storage node 120 may include a plurality of SSDs which may be relatively inexpensive.

The storage nodes 120 may be configured to have the same capacity as each other or different capacities from each other. In an embodiment, the data stored in each storage node 120 is made redundant internally within the storage node, made redundant at a different storage node, or both. As will be discussed below with reference to FIGS. 4C and 4D, each storage node 120 further includes a non-volatile random-access memory (NVRAM) and an interface module for interfacing with the compute nodes 110.

The storage nodes store the filesystems' data and metadata. At least part of the filesystem metadata may be stored in the NVRAM, for example, the upper layers of the data structures illustrated in FIGS. 1 and 2 may be stored in the NVRAM, while the lower layers of the filesystem metadata, such as the name blocks 240, may be stored in the SSDs.

A storage node 120 may be configured to communicate with the compute nodes 110 over the communication fabric 130. It should be noted that each compute node 110 can communicate with each storage node 120 over the communication fabric 130. There may not be a direct coupling between a compute node 110 and storage node 120.

In the embodiment, the communication fabric 130 may include an Ethernet fabric, an InfiniB and fabric, and the like. Specifically, the communication fabric 130 may enable communication protocols such as, but not limited to, remote direct memory access (RDMA) over Converged Ethernet (RoCE), iWARP, Non-Volatile Memory Express (NVMe), and the like. It should be noted that the communication protocols discussed herein are provided merely for example purposes, and that other communication protocols may be equally utilized in accordance with the embodiments disclosed herein without departing from the scope of the disclosure.

It should be further noted that the communication between the compute nodes 110 and the storage nodes 120 is always facilitated over the fabric 130. It should be further noted that the compute nodes 120 can communicate with each other over the fabric 130. The fabric 130 is a shared fabric.

Figure 4B:
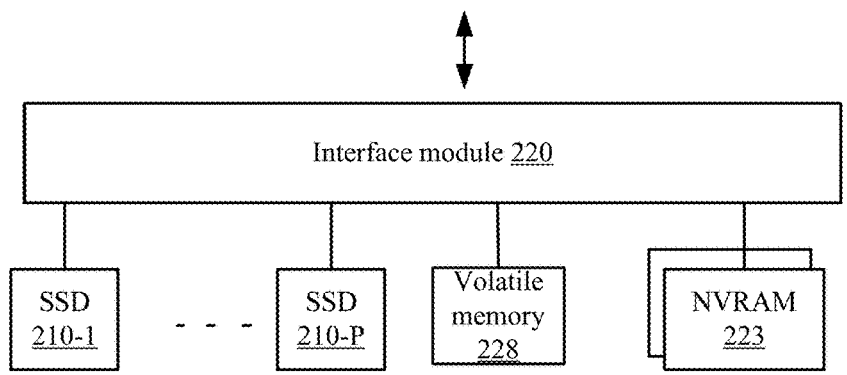
FIG. 4B is an example of a storage node.

FIG. 4B shows an example block diagram illustrating a storage node 120 according to an embodiment. The storage node 120 includes a plurality of storage devices such as SSDs 210-1 through 210-P (hereinafter referred to individually as an SSD 210 and collectively as SSDs 210, merely for simplicity purposes), at least one NVRAM, and an interface module 220.

According to the disclosed embodiments, the NVRAM 223 is utilized to reduce the number of write accesses to the SSDs 210 and the write amplification. According to an embodiment, data is written first to the NVRAM 223, which returns an acknowledgement after each such data write. Then, during a background process, the data is transferred from the NVRAM 223 to the SSDs 210. The data may kept in the NVRAM 223 until the data is completely written to the SSDs 210. Furthermore, this writing procedure ensures no data is lost when power is off.

As the NVRAM 223 supports low write latency and parallel writes, the storage node 120 supports these features. Specifically, the low latency is achieved by acknowledging the write request once the data is saved to the NVRAM 223. The parallel writes are achieved by serving multiple concurrent write requests by the NVRAM 223 and, during the background process, independently fulfilling such requests by saving the data into the SSDs 210.

Figure 4C:
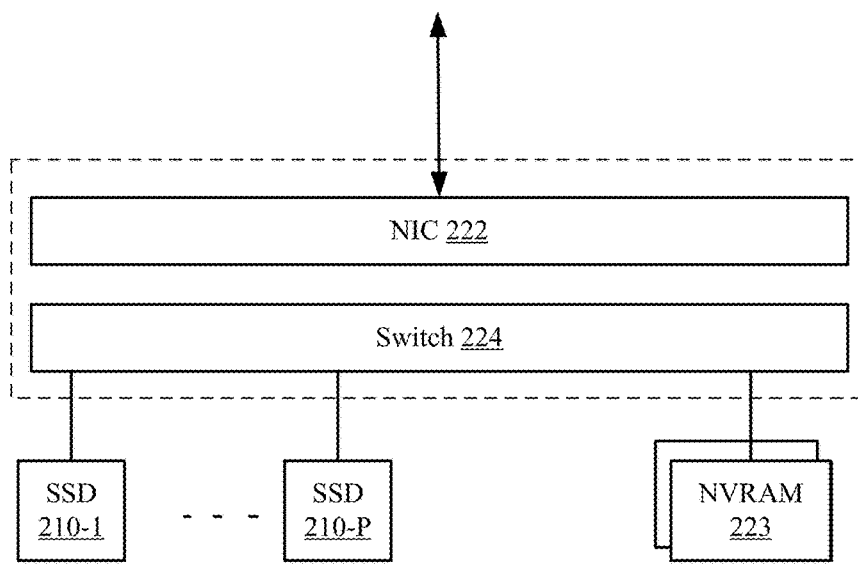
FIG. 4C is an example of an interface module of a storage node.

FIG. 4C shows an example block diagram of an interface module 220. In an example embodiment, an interface module 220 includes a network interface card (NIC) 222 and a switch 224 connected through an internal bus (not shown), e.g., a PCIe bus.

The NIC 222 allows the communication of the storage node 120 with the compute nodes (110, FIG. 4A) over the communication fabric (130, FIG. 4A). The NIC 222 may allow communication via at least one of the protocols discussed above.

The switch 224 allows the connection of the multiple SSDs 210 and NVRAM 223 to and NIC 222. In an example embodiment, the switch 224 is a PCIe switch.
In another embodiment, more than one PCIe switch is utilized to support more connectivity to the SSDs. In some configurations, where non PCIe SSDs 210 are available (e.g., Ethernet SSDs), the switch 224 may be a non PCIe switch, for example an Ethernet switch.

Figure 4D:
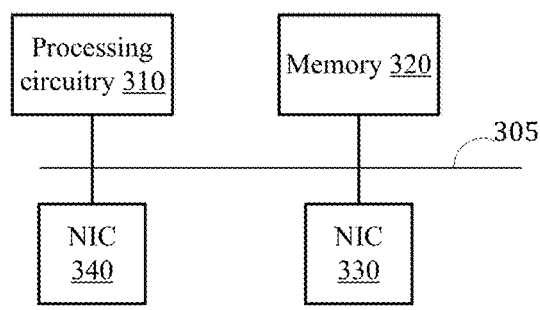
FIG. 4D is an example of a compute node.

FIG. 4D shows an example block diagram illustrating a compute node 110 according to an embodiment. The compute node 110 includes a processing circuitry 310, a memory 320, a first network interface controller (NIC) 330 and a second NIC 340. In an embodiment, the components of the compute node 110 may be communicatively connected via a bus 305.

The processing circuitry 310 may be realized as one or more hardware logic components and circuits. For example, and without limitation, illustrative types of hardware logic components that can be used include a field programmable gate array (FPGA), an Application Specific Integrated Circuit (ASIC), an Application Specific Standard Product (ASSP), a System On Chip (SOC), a general-purpose microprocessor, a microcontroller, a Digital Signal Processor (DSP), a neural network processor, and the like, or any other hardware logic components that can perform calculations or other manipulations of information.

The memory 320 may be volatile (e.g., RAM, etc.), non-volatile (e.g., ROM, flash memory, etc.), or a combination thereof. In one configuration, computer readable instructions or software to implement one or more processes performed by compute node 110 may be stored in the memory 320. Software shall be construed broadly to mean any type of instructions, whether referred to as software, firmware, middleware, microcode, hardware description language, or otherwise. Instructions may include code (e.g., in source code format, binary code format, executable code format, or any other suitable format of code).

The first NIC 330 allows the compute node 110 to communicate with the storage nodes via the communication fabric 130 (see FIG. 4A) to provide remote direct memory access to data stored in the storage nodes. In an embodiment, the first NIC 130 may enable communication via RDMA protocols such as, but not limited to, InfiniB and, RDMA over Converged Ethernet (RoCE), iWARP, and the like.

The second NIC 340 allows the compute node 110 to communicate with client devices (e.g., client device 140, FIG. 4A) through a communication network (e.g., the network 150, FIG. 4A). Examples for such a network includes, but is not limited to, the Internet, the world-wide-web (WWW), a local area network (LAN), a wide area network (WAN), and the like. It should be appreciated that in some configurations, the compute node 110 may include a single NIC. This configuration is applicable when, for example, the fabric is shared.

There may be provided a method for preventing file system case related errors, the method may include (i) receiving, by a storage system, an indication that a case insensitive file system client intends to cache a first file of a file system; (ii) searching for match between (a) at least a part of a case-insensitive version of a case-sensitive pathname of the first file, and (b) at least a part of a case-insensitive version of a case-sensitive pathname of a second file that belongs to the file system (for example any other file of a file system, any other file of the same directory as the first file, and the like) and differs from the first file; and (iii) preventing a caching of the first file by the case insensitive file system client.

The at least one part of the case-insensitive version of a case-sensitive pathname of the first file may be a case-insensitive version (for example—lillian1) of a case-sensitive directory name (for example—Lillian1) of a directory that stores the first file.

The at least one part of the case-insensitive version of a case-sensitive name of the first file may be a case-insensitive version (for example—f1) of a case-sensitive file name (for example—F1) of the first file.

The receiving of the indication may include receiving a request to gain exclusive access to the first file.

The preventing of the caching may include rejecting the request to gain exclusive access to the first file.

The searching may include (i) searching for an initial match between a hashed version (for example—HV(f1)) of a case-insensitive version of a case-sensitive file name of the first file, and a hashed version of a case-insensitive version of a case-sensitive file name of another file (for example—HV($f_{other}$)—$f_{other}$ is any other file in the file system and/or in the directory of F1) or any; and (ii) only when finding the initial match proceeding to finding a match between (a) the case-insensitive version of the case-sensitive file name of the first file, and a case-insensitive version of a case-sensitive file name of the second file.

The searching for the searching for an initial match may be preceded by searching for a directory that includes the first file, wherein the searching for the directory may include utilizing a hashed version of a name of the directory.

The case-insensitive version of the case-sensitive pathname of the first file may be of a predefined format. The method may include (i) receiving a request from the case insensitive file system client to add a new file having a new file name to the file system; and (ii) generating a case-insensitive version, of the predefined format, of the new file name to a file system metadata.

The first file was generated based on a request of a Network File System client.

The case insensitive file system client may be a Server Message Block client.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for preventing file system case related errors, the method comprises:
   receiving, by a storage system, an indication that a case insensitive file system client intends to cache a first file of a file system;
   searching for match between (a) at least a part of a case-insensitive version of a case-sensitive pathname of the first file, and (b) at least a part of a case-insensitive version of a case-sensitive pathname of a second file that belongs to the file system and differs from the first file; and when there is a match, preventing a caching of the first file by the case insensitive file system client.

2. The method according to claim 1 wherein the at least one part of the case-insensitive version of a case-sensitive pathname of the first file is a case-insensitive version of a case-sensitive directory name of a directory that stores the first file.

3. The method according to claim 1 wherein the at least one part of the case-insensitive version of a case-sensitive name of the first file is a case-insensitive version of a case-sensitive file name of the first file.

4. The method according to claim 1 wherein the receiving of the indication comprises receiving a request to gain exclusive access to the first file.

5. The method according to claim 4 wherein the preventing of the caching comprises rejecting the request to gain exclusive access to the first file.

6. The method according to 1 wherein the searching comprises:
   searching for an initial match between a hashed version of a case-insensitive version of a case-sensitive file name of the first file, and a hashed version of a case-insensitive version of a case-sensitive file name of another file; and
   only when finding the initial match proceeding to finding the match.

7. The method according to claim 1 wherein the searching for the initial match is preceded by searching for a directory that includes the first file, wherein the searching for the directory comprises utilizing a hashed version of a name of the directory.

8. The method according to claim 1 wherein the case-insensitive version of the case-sensitive pathname of the first file is of a predefined format; wherein the method comprises:
   receiving a request from the case insensitive file system client to add a new file having a new file name to the file system; and
   generating a case-insensitive version, of the predefined format, of the new file name to a file system metadata.

9. The method according to claim 1 wherein the first file was generated based on a request of a Network File System client.

10. The method according to claim 9 wherein the case insensitive file system client is a Server Message Block client.

11. A non-transitory computer readable medium for preventing file system case related errors, the non-transitory computer readable medium stores instructions for:
   receiving, by a storage system, an indication that a case insensitive file system client intends to cache a first file of a file system;
      searching for match between (a) at least a part of a case-insensitive version of a case-sensitive pathname of the first file, and (b) at least a part of a case-insensitive version of a case-sensitive pathname of a second file that belongs to the file system and differs from the first file; and
      when there is a match, preventing a caching of the first file by the case insensitive file system client.

12. The non-transitory computer readable medium according to claim 11 wherein the at least one part of the case-insensitive version of a case-sensitive pathname of the first file is a case-insensitive version of a case-sensitive directory name of a directory that stores the first file.

13. The non-transitory computer readable medium according to claim 11 wherein the at least one part of the case-insensitive version of a case-sensitive name of the first file is a case-insensitive version of a case-sensitive file name of the first file.

14. The non-transitory computer readable medium according to claim 11 wherein the receiving of the indication comprises receiving a request to gain exclusive access to the first file.

15. The non-transitory computer readable medium according to claim 14 wherein the preventing of the caching comprises rejecting the request to gain exclusive access to the first file.

16. The non-transitory computer readable medium according to 11 wherein the searching comprises:
   searching for an initial match between a hashed version of a case-insensitive version of a case-sensitive file name of the first file, and a hashed version of a case-insensitive version of a case-sensitive file name of another file; and
   only when finding the initial match proceeding to finding the match.

17. The non-transitory computer readable medium according to claim 11 wherein the searching for the initial match is preceded by searching for a directory that includes the first file, wherein the searching for the directory comprises utilizing a hashed version of a name of the directory.

18. The non-transitory computer readable medium according to claim 11 wherein the case-insensitive version of the case-sensitive pathname of the first file is of a predefined format; wherein the non-transitory computer readable medium comprises:
   receiving a request from the case insensitive file system client to add a new file having a new file name to the file system; and
   generating a case-insensitive version, of the predefined format, of the new file name to a file system metadata.

19. The non-transitory computer readable medium according to claim 11 wherein the first file was generated based on a request of a Network File System client.

20. The non-transitory computer readable medium according to claim 19 wherein the case insensitive file system client is a Server Message Block client.

* * * * *